J. C. STEVENS.
FISH HOOK RELEASER.
APPLICATION FILED JUNE 15, 1916.
1,215,073.
Patented Feb. 6, 1917.
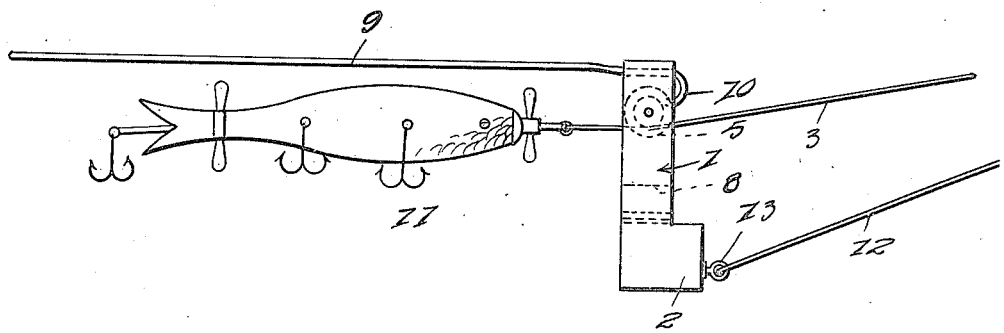
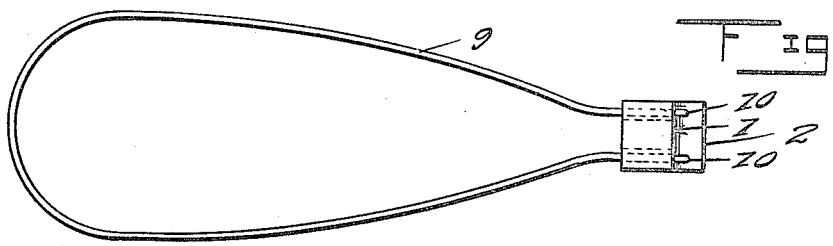
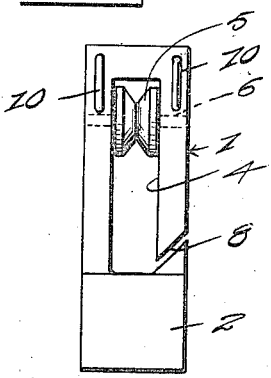
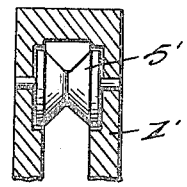
Witnesses
CR Beall
Robt Meyer
Inventor
J. C. Stevens.
By
Attorney

UNITED STATES PATENT OFFICE.

JAMES C. STEVENS, OF BEDFORD, INDIANA.

FISH-HOOK RELEASER.

1,215,073.  Specification of Letters Patent.  Patented Feb. 6, 1917.

Application filed June 15, 1916. Serial No. 103,775.

*To all whom it may concern:*

Be it known that I, JAMES C. STEVENS, a citizen of the United States, residing at Bedford, in the county of Lawrence and State of Indiana, have invented certain new and useful Improvements in Fish-Hook Releasers; and I do hereby declare the following to be a full, clear, and exact description of the invention, such as will enable others skilled in the art to which it appertains to make and use the same.

This invention relates to a device which is designed for releasing fishing hooks or artificial bait when it becomes snagged or entangled with rocks, roots or the like in the bottom of a stream.

An object of this invention is to provide a weighted body which has a roller rotatably carried thereby, which is adapted for traveling over the ordinary fishing line, downwardly to the hooks or artificial minnow which is attached to the lower end of the line and which body further has a line attached thereto so that when the body reaches the bait or hook it may be moved by means of the line which is attached thereto for releasing the hook, and thereby preventing the loss of the hook or minnow, and also a portion of the line which is attached to the hook.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a side elevation of the releaser showing the application of the same.

Fig. 2 is a plan view of the releaser.

Fig. 3 is an edge elevation of the releaser, and

Fig. 4 is a section through a modified form of the releaser.

Referring more particularly to the drawing, 1 designates the body of the releaser as an entirety, which is constructed of any suitable metal so as to provide the necessary weight to the body 1. The lower end 2 of the body 1 is enlarged, for weighting the same so that it will maintain a substantially vertical position as illustrated in Fig. 1 while traveling downwardly over an ordinary fishing line as indicated at 3. The body 1 is provided with an opening 4 which extends therethrough, and in which is positioned a roller 5. The roller 5 is provided with a concaved periphery, for receiving the line 3 and it is rotatably mounted upon a pin 6 which is carried by the body 1. The body 1 is provided with a slot 8 which communicates with the opening 4 and permits the mounting of the releaser upon the ordinary fishing line 3.

A loop 9 which is constructed of wire is attached to the upper end of the body 1 and extends outwardly in a horizontal plane from one side or edge of the upper end of the body as clearly shown in Figs. 1 and 2 of the drawing. The ends of the wire of which the loop 9 is formed extend through the body and are rolled or bent as shown at 10, having their terminals seated in the body for securely connecting the wire to the body 1 and preventing the ends of the wire from catching upon debris during the travel of the releaser downwardly over the fishing line 3.

When the artificial bait as indicated by the numeral 11 in Fig. 1 of the drawing becomes snagged or entangled upon rocks, weeds, roots or the like when fishing, the releaser is mounted upon the line 3 which is connected to the bait or hook 11 and its weight will carry it downwardly over the line until it reaches the artificial minnow or bait 11. After the body 1 has reached the limit of its lower movement the line 12, which is connected to the weighted end of the body 2 by means of a swiveled eye 13 is pulled upwardly, which will rock the body on the roller 5 as an axis and move the loop 9 downwardly over the bait or hook 11 for releasing the same. If any one of the hooks of the minnow are securely embedded in the article to which the minnow is hooked, the downward movement of the loop 9 may break the hook, but it will release the remainder of the minnow, and the broken hook may be easily replaced.

In Fig. 4 of the drawing, a modified form of the releaser is illustrated, which shows portions of the periphery of the roller 5' counter-sunk in the side of the body 1' so as to eliminate the liability of the line 3 catching between the ends of the roller and the inner faces of the sides which surround the recess 4.

In reducing the invention to practice, certain minor features of construction, combination and arrangement of parts may necessitate alterations to which the patentee is entitled provided such alterations are comprehended within the scope of what is claimed.

What is claimed is:—

1. In a device as set forth, a body having its lower end weighted, said body provided with an opening extending therethrough and with a slot communicating with the body for permitting the mounting of the body upon a fishing line, a roller rotatably supported within said opening and having a concaved periphery, and a wire loop attached to and extending outwardly from the upper end of said body.

2. In a device as set forth, a weighted body adapted for mounting upon a fishing line, and a loop attached to and extending outwardly from one side of one end of said body and adapted for passing about an artificial fishing bait for releasing the bait from an object with which it has become entangled.

In testimony whereof I affix my signature in presence of two witnesses.

JAMES C. STEVENS.

Witnesses:
 FRED T. BOWERS,
 H. BELLVILLE.

Copies of this patent may be obtained for five cents each, by addressing the "Commissioner of Patents, Washington, D. C."